United States Patent [19]

Hasegawa et al.

[11] Patent Number: 5,399,266

[45] Date of Patent: Mar. 21, 1995

[54] MICROBIAL MEDIA AND WASTE WATER TREATMENT METHOD USING SAME

[75] Inventors: Moriju Hasegawa; Jong Ok Han, both of Tokyo, Japan

[73] Assignee: Resource Biology Research Institute Co., Ltd., Tokyo, Japan

[21] Appl. No.: 126,761

[22] Filed: Sep. 27, 1993

[30] Foreign Application Priority Data

Mar. 26, 1993 [JP] Japan .................................. 5-091969

[51] Int. Cl.⁶ ............................................. C02F 3/04
[52] U.S. Cl. .................................. 210/615; 210/150; 210/508; 428/169
[58] Field of Search ............. 210/615, 150, 508–509, 210/510.1, 505; 428/169; 261/94, 100

[56] References Cited

U.S. PATENT DOCUMENTS

| 4,422,930 | 12/1983 | Hatanaka | 210/615 |
| 4,680,111 | 7/1987 | Veda | 210/615 |
| 4,717,519 | 1/1988 | Sagami | 210/615 |

FOREIGN PATENT DOCUMENTS

| 64-34496 | 3/1989 | Japan | 210/615 |
| 2-52094 | 2/1990 | Japan | 210/615 |

Primary Examiner—Thomas Wyse
Attorney, Agent, or Firm—Millen, White, Zelano & Branigan

[57] ABSTRACT

A microbial media comprising numerous U type loops having at least two types of fibers woven on a central stay, at least one of these fibers being polyvinylidene chloride, acryl, nylon, polypropylene, polyethylene or carbon; and a waste water treatment method using same.

11 Claims, 1 Drawing Sheet

MICROBIAL MEDIA AND WASTE WATER TREATMENT METHOD USING SAME

THE FIELD OF THE INVENTION

This invention relates to a microbial media and a method of purifying waste water by its utilization. More specifically, this invention relates to a method which not only reduces the amount of sludge generated, but also improves the effectiveness rate of treating waste water.

BACKGROUND OF THE INVENTION

Conventional water purification involves waste water treatment by organic means. This is known to be biologically effective, and an activated sludge process is generally used.

However, in this activated sludge process, while sedimentation of solids is improved due to proliferation of filamentous fungus, generation of sludge is increased which leads to higher sludge treatment costs.

Furthermore in such processes, due to the amount of waste water, changes of load and inflow of toxic materials, an impact load phenomena occurs leading to considerable reduction in the treatment effect.

Conventionally, to find a solution to such problems, a trickling filter process, or rotating biological contactor process, etc, have been used to treat waste water, but all such processes had inconveniences such as breaking away of the microorganism, freezing during winter time and emission of odors.

SUMMARY OF THE INVENTION

Accordingly the object of this invention is to reduce the generation of sludges and increase the amount of adhesion of the microorganism by providing a microbial media to enable more effective treatment than the conventional processes in terms of biological treatment of organic waste water.

Another object of this invention is to prevent breaking away or freezing of the microorganism by providing a purification method of waste water which also can suppress emission of odors.

The aforesaid objects are achieved by a microbial media which comprises at least two types of fibers woven on a central stay so as to form numerous U type loops, wherein at least one component material of the fibers is polyvinylidene chloride, nylon, polypropylene, polyethylene or carbon, this media being used for purifying waste water.

DETAILED DESCRIPTION OF THE INVENTION

Figure 1:
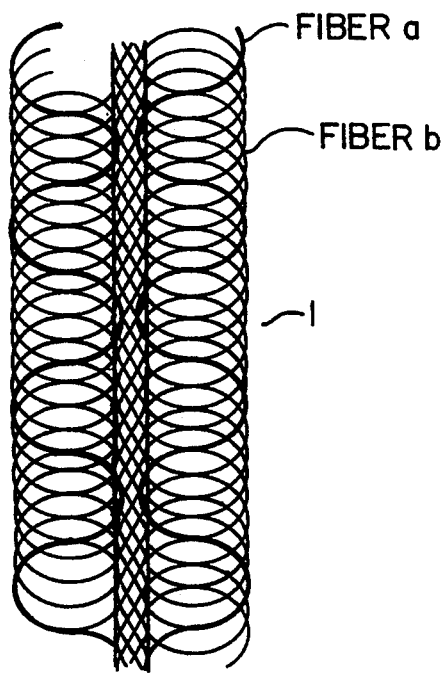
FIG. 1 is a sketch showing a microbial media waste water treatment apparatus according to this invention consisting of two types of fiber woven on a central stay so as to form numerous U type loops.

The microbial media according to this invention comprises fibers which function as a microorganism support fixed to a central stay so as to form numerous U type loops of transverse threads.

The transverse threads forming U type loops which are woven onto the central stay may consist of any of the fibers mentioned above, but in this invention at least two types of fibers are used. Although the reason for the advantage obtained by using two or more types of fibers is not clear, it appears that the capacity for containing microorganism is increased and ability to treat waste water is improved, compared to the case of using only one type of fiber.

The material of the transverse threads may be chosen from polyvinylidene chloride, acryl, polyethylene, polypropylene or carbon fibers, but it is preferable to include acryl fiber without exception.

For example, when a microbial media using polyvinylidene chloride fiber [hereinafter referred to as BM] and a microbial media using polyvinylidene chloride fiber and acryl in a ratio of 1/1 on the basis of volume (hereinafter referred to as SM) are compared, SM has a larger specific surface and larger surface indentations.

In short, SM has more advantageous conditions for adhesion of microorganisms to the surface of the media. In terms of the actual adhesion rate of volatile organic matter as shown in the following examples, SM has 30-64% more adhesion than BM.

It is preferable that the fiber diameter of the transverse threads is small from the viewpoint of increasing the specific surface of the media, however to prevent breaking of the threads in the production process or in actual use there is a natural limit to the fiber diameter. For example it is desirable that this diameter is 30-100 $\mu$m for polyvinylidene fiber, and 1-100 $\mu$m for acryl or nylon, but for acryl or nylon it should preferably lie within the range of 5-50 $\mu$m.

When treating waste water by means of the microbial media of this invention, it is desirable to remove inorganic SS (Suspended Solid) or solids from collected waste water.

Thereafter, adjustment should be made by aeration to ensure a high level of dissolved oxygen in the waste water as it moves from upstream to downstream.

The waste water treatment apparatus therefore comprises at least a waste water collecting tank (3), filtration tank (4) for sedimentation filtration of inorganic SS or solids, and an aeration tank (2) for introducing air and adjusting dissolved oxygen. For example, the aeration tank (2) may be divided into 4 sections wherein the dissolved oxygen is adjusted respectively to 1,2,3,4 ppm from upstream to downstream and the total retention time is about 12 hours.

In this way, aerobic and anaerobic treatment is possible.

Furthermore, when the filtration tank (4) is installed in front of the aeration tank (2), adhesion of heavy inorganic material is prevented and conditions for adhesion of microorganisms are improved.

As regards analysis of waste water, it is desirable to check pH, BOD (Biological Oxygen Demand), COD (Chemical Oxygen Demand) (Mn), COD (Cr), SS, phosphorus concentration, nitrogen concentration and surfactant concentration etc. For this analysis, standard measuring methods are adopted.

The microbial media of this invention comprises at least two types of fibers arranged so as to form numerous U type loops.

Accordingly, the adhesion conditions for microorganisms are good and can be used to maximum advantage for treatment of waste water, hence biological treatment of organic waste water can be performed effectively.

Further, the waste water treatment method of this invention prevents breaking away of microoganisms, prevents freezing during winter, and suppresses odor generation.

Moreover unlike conventional activated sludge processes, it does not require any secondary sedimentation tank, dewatering facility, sludge returning facility or other facilities.

Hereinafter an actual example utilizing this invention will be described, but it should be understood that the invention is not limited to this example.

EXAMPLE

Figure 2:
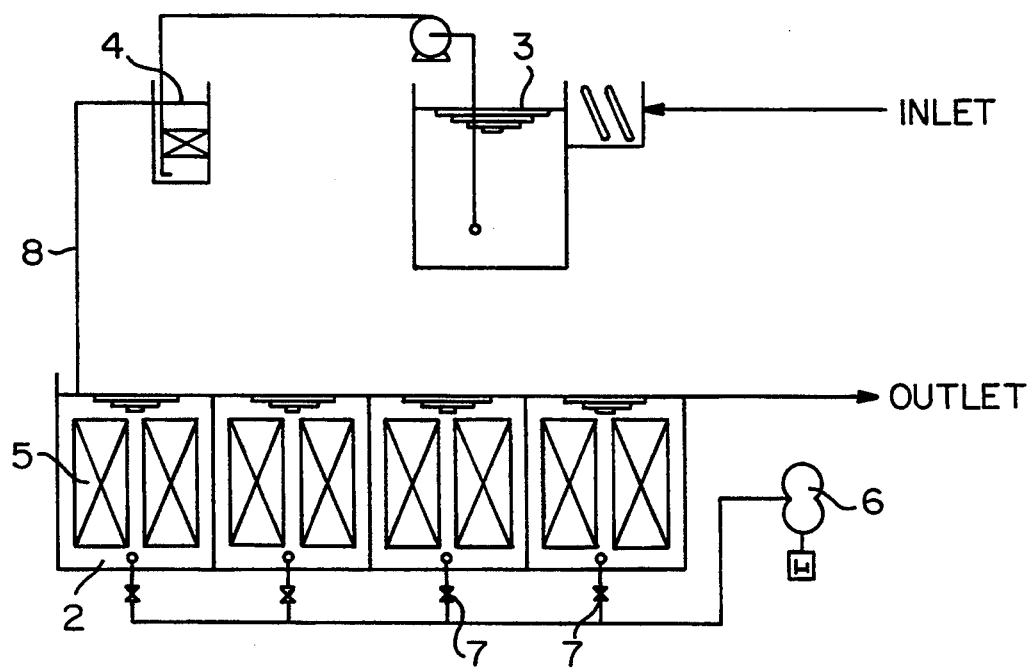
FIG. 2 is a sketch showing an example of the apparatus according to this invention for waste water treatment.

Referring to the drawings, FIG. 1 shows an example of a microbial media according to this invention whereby two types of fibers, namely Fiber a and Fiber b, are woven on a central stay so as to form numerous U type loops. FIG. 2 is a sketch showing an example of waste water treatment where this microbial media (1) is filled in an aeration tank (2).

In FIG. 2 there are two reaction tanks (5) in the aeration tank (2) which is filled with the microbial media (1), and which consists of four auxiliary chambers. (3) is a water collecting tank, (4) is a filtration tank and (6) is an air blower.

To facilitate the circulation of water, the microbial media (1) are filled so as to maintain a gap of at least 10 mm with the walls of the reaction tanks (5). On the lower edge of the center part of the aeration tank (2), an air stone is installed and connected to the air blower (6), valves (7) being installed in each reaction tank to adjust dissolved oxygen.

Waste water filtered by the filtration tank (4) flows into the first reaction tank (5) through a pipe (8), and is thereby purified.

The intervals between the reaction tanks (5) should be at least 20 mm, and 20 mm space should be maintained between the reaction tanks (5) and the upper and lower sides of the aeration tank (2).

The water temperature in all the reaction tanks is maintained at 20°±1° C.

Dissolved oxygen in the aeration tank (2) is measured frequently by means of a DO METER, and pH is checked frequently by means of a pH meter to maintain the amount of oxygen stable.

The quantity of dissolved oxygen in each reaction tank is adjusted to be 1 ppm, 2 ppm, 3 ppm and 4 ppm respectively from upstream to downstream.

Using 32.4 liter of SM as the microbial media, waste water was treated for 8 days consecutively. The microbial media was brought out from each chamber of the reaction tank so that the sludge adhered to the microbial media did not break away. Then the sludge adhering to the microbial media was washed off by a fixed quantity of distilled water.

The sludge was placed in a drying oven, completely dried for 3-4 days at a temperature of 103° C., and weighed.

This dried matter was then completely burnt at 600°-650° C., and the residue weighed.

The difference between the weight of the sludge and the weight of the residue after combustion, i.e., the weight of microorganisms adhering to the media, was calculated.

The result was respectively 22.5 g, 24 g, 23.8 g, and 17.5 g, in a sequence starting from No.1 chamber of the aeration tank (2). The amount of adhesion being largest in No.2 chamber.

BOD and nitrogen concentration in the water was measured prior to and after treatment. The decline of BOD was found to be 90%, and the amount of nitrogen removed was found to be 74% by the indophenol method and 61% by the hexane extraction method.

On the other hand, when 40 liter of BM was used as the microbial media, waste water was treated under identical conditions to those mentioned above and measurements were made by identical methods, the amount of adhesion of microoganisms in a sequence starting from No. 1 Chamber was respectively, 13.8 g, 18.5 g, 16 g and 12.5 g, which is less than in the case of the microbial media of this invention. The decline of BOD was 86%, while removal of nitrogen was 64% by the indophenol method and 52% by the hexane extraction method. From this result it is seen that the microbial media of this invention is more effective.

What is claimed:

1. A microbial media comprising numerous U type loops of fibers woven on a central stay, wherein, in the U type loops of fibers are of at least two different component materials, and at least one component material of said fibers is polyvinylidene chloride, acryl, nylon, polypropylene, polyethylene or carbon.

2. A microbial media as defined in claim 1 wherein a least one of said component materials forming said U type loops is acryl fiber.

3. A microbial media as defined in claim 1 wherein said U type loops of fibers have a diameter of 1-100 $\mu$m.

4. A microbial media as defined in claim 2, wherein the diameter of the acryl fiber lies from 1 $\mu$m to 100 $\mu$m.

5. A microbial media as defined in claim 4, wherein the diameter of the acryl fiber lies from 5 $\mu$m to 50 $\mu$m.

6. A microbial media as defined in claim 4 wherein a component material used other than acryl fiber is polyvinylidene chloride.

7. A waste water treatment method comprising removing inorganic suspended solids or solids from the waste water by sedimentation filtration in a filtration tank, and purifying the water in an aeration tank filled with the microbial media of claim 1.

8. A waste water treatment method as defined in claim 7, wherein said aeration tank containing said microbial media is divided into at least four treatment chambers.

9. A waste water treatment method as defined in claim 8, wherein the amount of dissolved oxygen in each chambers is adjusted so as to increase from upstream to downstream.

10. A waste water treatment method as defined in claim 8 wherein the temperature in all of the aeration tanks is adjusted be about 20° C.

11. A waste water treatment method as defined in claim 9, wherein the temperature in all of the aeration tanks is adjusted to be about 20° C.

* * * * *